(12) United States Patent  
Marchitto et al.

(10) Patent No.: US 8,593,027 B2  
(45) Date of Patent: Nov. 26, 2013

(54) PERMANENT MAGNET ROTOR

(75) Inventors: Luciano Marchitto, Pianezza (IT);  
Nicola Re, Rivalta di Torino (IT)

(73) Assignee: Gate S.R.L., Turin (IT)

(*) Notice: Subject to any disclaimer, the term of this patent is extended or adjusted under 35 U.S.C. 154(b) by 210 days.

(21) Appl. No.: 13/007,105

(22) Filed: Jan. 14, 2011

(65) Prior Publication Data

US 2011/0175479 A1 Jul. 21, 2011

(30) Foreign Application Priority Data

Jan. 15, 2010 (IT) .............................. TO2010A0025

(51) Int. Cl.  
*H02K 1/27* (2006.01)

(52) U.S. Cl.  
USPC ............ 310/156.12; 310/156.19; 310/156.26; 310/156.38

(58) Field of Classification Search  
USPC ............... 310/156.01–156.74, 67 R  
See application file for complete search history.

(56) References Cited

U.S. PATENT DOCUMENTS

| | | | | |
|---|---|---|---|---|
| 5,907,206 | A * | 5/1999 | Shiga et al. | 310/156.05 |
| 7,282,823 | B2 * | 10/2007 | Hilton | 310/62 |
| 8,030,808 | B2 * | 10/2011 | Zhang | 310/43 |
| 8,089,189 | B2 * | 1/2012 | Himmelmann | 310/156.22 |

* cited by examiner

*Primary Examiner* — Tran Nguyen  
*Assistant Examiner* — Leda Pham  
(74) *Attorney, Agent, or Firm* — Muncy, Geissler, Olds & Lowe, PLLC

(57) ABSTRACT

A permanent magnet rotor for a brushless electric motor of the kind with an internal stator, has a carrier structure of molded plastic that includes a disc portion fixed to a shaft. The disc portion has a periphery joined to a substantially cylindrical cage portion coaxial with the shaft. The cage portion accommodates a magnetic flux conducting structure forming an wall which is coaxial with the shaft, and a plurality of permanent magnets shaped as ring segments, disposed at angular intervals within and adjacent to the flux conducting structure. Each magnet has its circumferentially terminal faces parallel with each other or converging in the outward direction. The cage portion is overmolded onto the flux conducting structure and has a plurality of angularly spaced struts which are essentially parallel to the axis of the rotor and which protrude radially inwards. Each of the struts having on its flanks respective containment surfaces which are essentially parallel to, or converge in the outward direction with, corresponding facing surfaces of the adjacent struts, such that between the magnetic flux conducting structure and each pair of adjacent struts there is defined a respective seat adapted to snugly receive a respective permanent magnet.

5 Claims, 4 Drawing Sheets

PERMANENT MAGNET ROTOR

CROSS REFERENCE TO RELATED APPLICATIONS

This non-provisional patent application claims priority under 35 U.S.C. §119(a) from Patent Application No. TO2010A000025 filed in Italy on Jan. 15, 2010.

FIELD OF THE INVENTION

This invention relates to a permanent magnet rotor for a brushless electric motor of the kind with an internal stator and to a method of making the rotor.

BACKGROUND OF THE INVENTION

More specifically this invention relates to a rotor of the kind that comprises a carrier structure of molded plastic that includes a disc portion to which there is centrally fixed a shaft and whose periphery is joined to an essentially cylindrical cage portion coaxial with the shaft, in which portion there are disposed a magnetic flux conducting structure forming an essentially cylindrical sort of wall which is coaxial with the shaft, and a plurality of permanent magnets shaped as ring segments, disposed at angular intervals within and adjacent to the magnetic flux conducting structure.

It is an object of the present invention to provide a rotor of this construction that can be assembled quickly and easily and that enables the tolerances caused by the assembly method to be reduced.

SUMMARY OF THE INVENTION

Accordingly, in one aspect thereof, the present invention provides a permanent magnet rotor for a brushless electric motor of the kind with an internal stator, the rotor comprising a carrier structure of molded plastic that includes a disc portion to which there is centrally fixed a shaft and whose periphery is joined to an essentially cylindrical cage portion coaxial with the shaft, in which portion there are disposed a magnetic flux conducting structure forming an essentially cylindrical wall which is coaxial with the shaft, and a plurality of permanent magnets shaped as ring segments, disposed at angular intervals within and adjacent to said flux conducting structure; wherein each magnet has its circumferentially terminal faces parallel with each other or converging in the outward direction, and the cage portion of the carrier structure is overmolded onto the flux conducting structure and, on an internal surface of the latter, forms a plurality of angularly spaced struts which are essentially parallel to the axis of the rotor and which protrude radially inwards; each of the struts having on its flanks respective containment surfaces which are essentially parallel to, or converge in the outward direction with, corresponding facing surfaces of the adjacent struts, such that between the magnetic flux conducting structure and each pair of adjacent struts there is defined a respective seat adapted to snugly receive a respective permanent magnet.

Preferably, each permanent magnet has its radially external surface glued to the internal surface of the flux conducting structure.

Preferably, each of said seats is adapted to allow the introduction and the positioning therein of the corresponding magnet, by means of an essentially translational movement of the magnet in a first direction which is parallel to the axis of the rotor towards the disc portion of the carrier structure, with the magnet longitudinally inclined by a predetermined angle with respect to said first direction, such that the magnet is capable of abutting against an axially terminal abutment surface of the seat, between two adjacent struts, and of then being rotated in an outward direction of the rotor so as to be disposed in contact with a corresponding portion of the magnetic flux conducting structure.

According to a second aspect, the present invention provides a method of introducing and positioning a permanent magnet into a seat of a rotor according to any one of the preceding claims, comprising the steps of: introducing the permanent magnet into the rotor by means of an essentially translational movement of the magnet in a first direction which is parallel to the axis of the rotor, towards the disc portion of the carrier structure, with the magnet longitudinally inclined by a predetermined angle with respect to said first direction until the magnet abuts against an axially terminal abutment surface of the seat between two adjacent struts, and thereafter rotating the magnet in the outward direction of the rotor until it is disposed in the seat in contact with a corresponding portion of the magnetic flux conducting structure.

Preferably, a layer of glue or the like is applied on the radially external surface of the permanent magnet before introducing the magnet into the rotor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
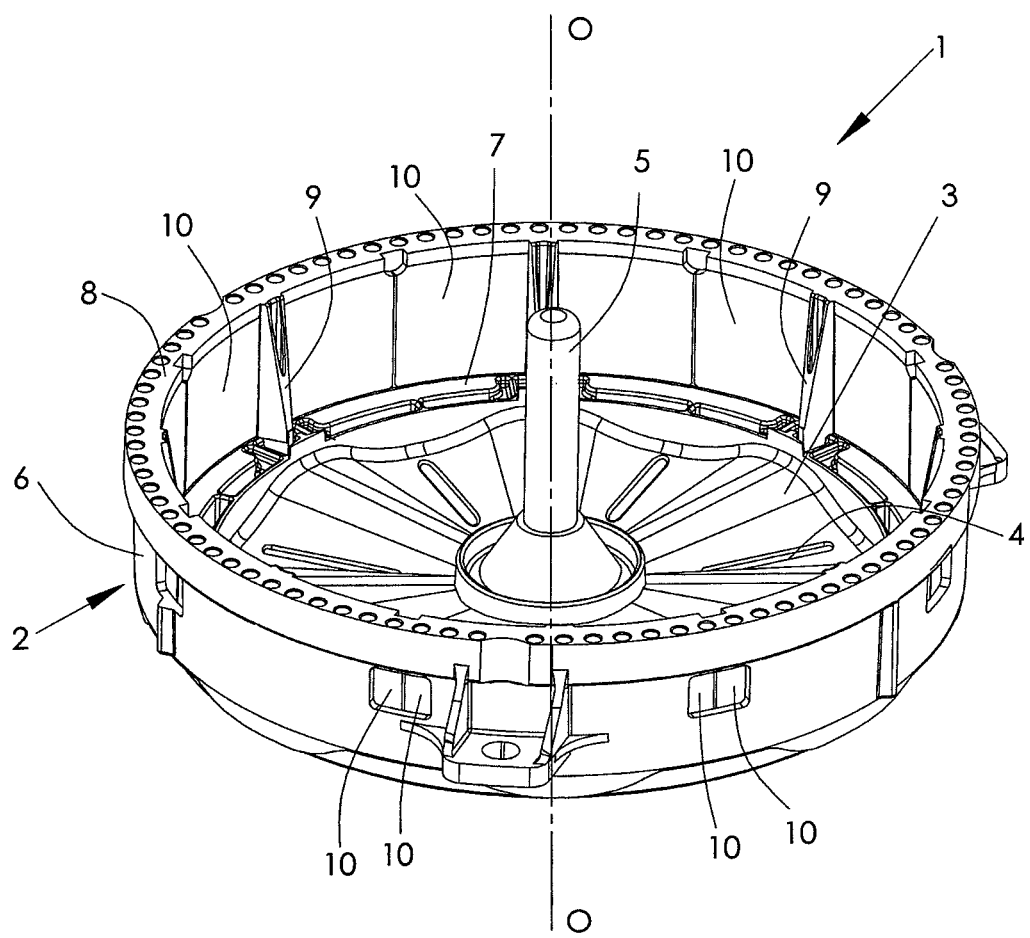
FIG. 1 is a perspective view of a permanent magnet rotor according to the present invention with magnets omitted.

In the drawings, reference numeral 1 is a general indication for a permanent magnet rotor for a brushless electric motor, in particular for a brushless direct-current motor of the sort having an internal stator (not shown).

Referring particularly to FIG. 1, the rotor 1 comprises a carrier structure 2 of molded plastic. This structure 2 includes an essentially disc-shaped portion 3 containing a plurality of essentially radial slots 4. The carrier structure 2 is overmolded on a central hub or shaft 5, which may be metal, which extends away from the disc portion 3. The periphery of the disc portion 3 is joined to an essentially cylindrical cage portion 6 that extends coaxially around the shaft 5.

In the embodiment illustrated, the cage portion 6 of the carrier structure 2 comprises essentially a first ring 7 connected to the periphery of the disc portion 3, and a second ring 8, axially spaced from but connected to the ring 7 by a plurality of struts 9 which are essentially parallel to the axis O-O of the rotor. A plurality of yokes 10 of magnetically conducting material shaped in the form of segments of a ring are embedded in the cage portion 6 of the carrier structure 2. These yokes 10 are set side by side in such a way that together they form an essentially cylindrical sort of wall (see especially FIGS. 1 and 2).

Figure 2:
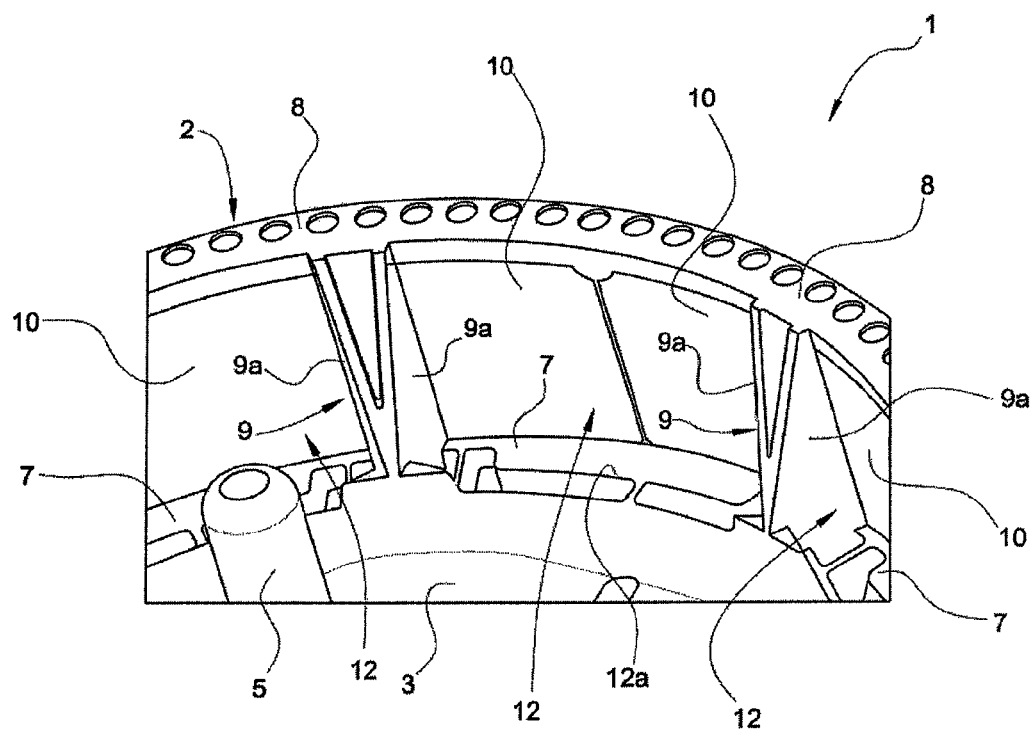
FIG. 2 is a view on an enlarged scale of a portion of the rotor of FIG. 1.
Figure 3:
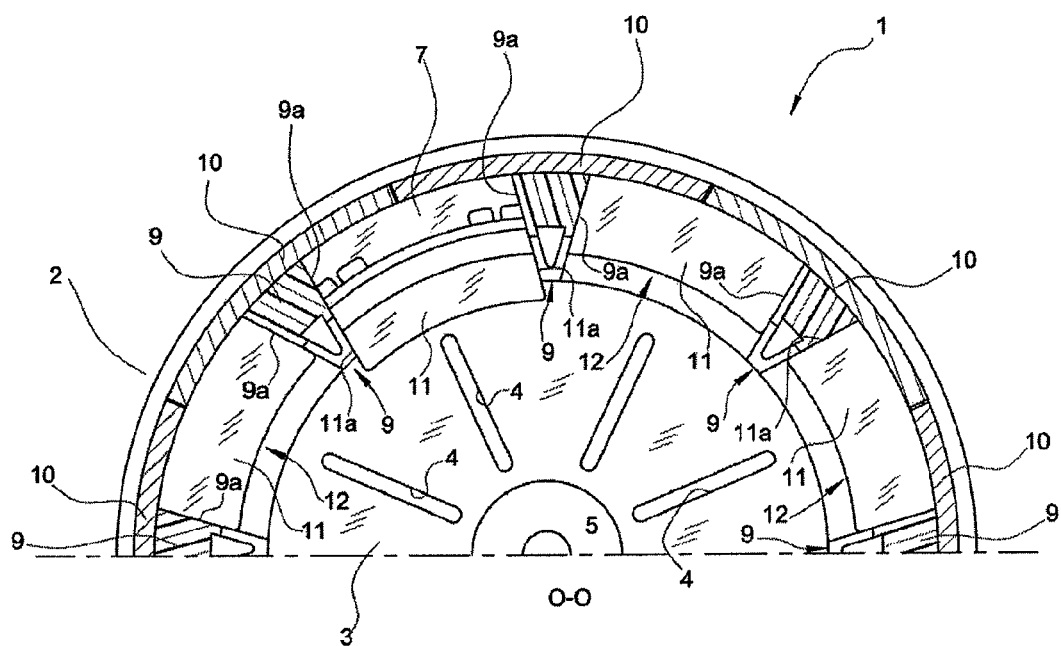
FIG. 3 is a partial view in transverse section through the rotor of FIG. 1, at the point when a magnet is being positioned in its seat.
Figure 4:
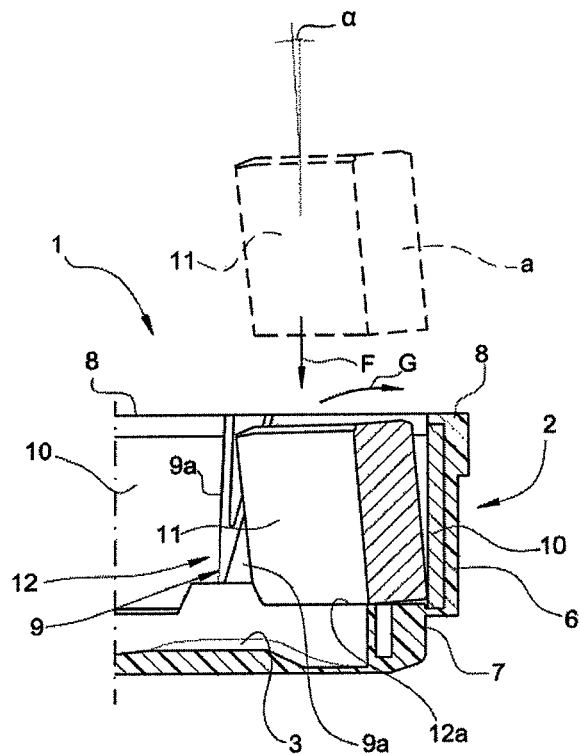
FIGS. 4 and 5 are partial views, partly in section, showing successive moments in the process of fitting a magnet to the rotor.
Figure 5:
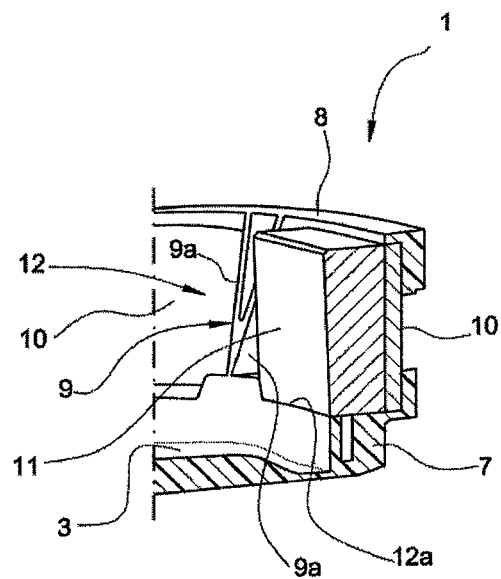

The rotor 1 also comprises a plurality of permanent magnets 11 (omitted for clarity from FIGS. 1 and 2 but see FIGS. 3 to 5). These magnets are in the form of segments of a ring and are magnetized to produce a magnetic pole facing the stator. With particular reference to FIG. 3, the permanent magnets 11 are mounted in the cage portion 6 of the carrier structure 2, each between two adjacent struts 9, in such a way that each magnet 11 straddles the join between two adjacent yokes 10. Each magnet 11 has its circumferentially terminal faces 11a parallel with each other, or optionally converging in the outward direction of the rotor 1.

The cage portion 6 of the carrier structure 2 is overmolded onto the yokes 10, and the struts 9 are formed as one piece with this cage portion 6, on the internal surface of the magnetic flux conducting structure formed by the yokes 10. The struts 9 are angularly equidistant and protrude radially into the rotor. Each strut 9 has on its flanks respective containment surfaces 9a which are essentially parallel (or optionally converge in the outward direction) to corresponding facing surfaces 9a of the adjacent struts 9.

Between the magnetic flux conducting structure and each pair of adjacent struts 9 there is thus defined a seat 12 adapted to receive snugly (that is practically without play in the circumferential direction) a respective permanent magnet 11. Each permanent magnet 11 has its radially external surface glued to the internal surface of the flux conducting structure formed by the yokes 10.

Referring particularly to FIGS. 2 to 5, each seat 12 is adapted to allow the introduction and positioning therein of the corresponding permanent magnet 11 by means of an essentially translational initial movement of the magnet 11, in the direction (indicated by the arrow F in FIG. 4) which is parallel to the axis of the rotor 1 towards the disc portion 3 of the carrier structure 2. In this translational movement the permanent magnet 11 is advantageously longitudinally inclined, by a predetermined angle denoted α in FIG. 4, with respect to the direction F. The abovementioned translational movement is such that the magnet 11 comes to rest against an axially terminal abutment surface 12a of the seat 12 between the corresponding pair of adjacent struts 9, as shown in particular in FIG. 4. The magnet 11 is then rotated in the outward direction of the rotor 1, as indicated by the arrow G in FIG. 4, so as to be disposed in contact with a corresponding portion of the magnetic flux conducting structure formed by the yokes 10.

Advantageously, before the magnet is inserted into the rotor 1, a layer of glue or the like is applied to its convex external surface in order to stabilize the position of this magnet in its seat 12 in the carrier structure 2.

The movement described above, which includes a translation in an inclined aspect of the magnet 11, followed by its rotation into the seat 12, ensures that the layer of glue applied to the external surface of the magnet cannot be removed during this movement.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A permanent magnet rotor for a brushless electric motor of the kind with an internal stator, the rotor comprising a carrier structure of molded plastic that includes a disc portion to which there is centrally fixed a shaft and whose periphery is joined to an essentially cylindrical cage portion coaxial with the shaft, in which portion there are disposed a magnetic flux conducting structure forming an essentially cylindrical wall which is coaxial with the shaft, and a plurality of permanent magnets shaped as ring segments, disposed at angular intervals within and adjacent to said flux conducting structure;

wherein each magnet has its circumferentially terminal faces parallel with each other or converging in the outward direction, the cage portion of the carrier structure is overmolded onto the flux conducting structure and, on an internal surface of the flux conducting structure, forms a plurality of angularly spaced struts which are essentially parallel to the axis of the rotor and which protrude radially inwards; each of the struts having on its flanks respective containment surfaces which are essentially parallel to, or converge in the outward direction with respect to, corresponding containment surfaces of the adjacent struts, such that between the magnetic flux conducting structure and each pair of adjacent struts there is defined a respective seat configured to snugly assemble a respective permanent magnet thereto, and wherein along an axial direction of the shaft, the radial length of the strut becomes greater as it gets closer to the disc portion.

2. The rotor of claim 1, wherein each permanent magnet has its radially external surface glued to the internal surface of the flux conducting structure.

3. The rotor of claim 1, wherein the struts are hollow.

4. A permanent magnet rotor for a brushless electric motor of the kind with an internal stator, the rotor comprising a carrier structure of molded plastic that includes a disc portion to which there is centrally fixed a shaft and whose periphery is joined to an essentially cylindrical cage portion coaxial with the shaft, in which portion there are disposed a magnetic flux conducting structure forming an essentially cylindrical wall which is coaxial with the shaft, and a plurality of permanent magnets shaped as ring segments, disposed at angular intervals within and adjacent to said flux conducting structure;

wherein each magnet has its circumferentially terminal faces parallel with each other or converging in the outward direction, the cage portion of the carrier structure is overmolded onto the flux conducting structure and, on an internal surface of the flux conducting structure, forms a plurality of angularly spaced struts which are essentially parallel to the axis of the rotor and which protrude radially inwards; each of the struts having on its flanks respective containment surfaces which are essentially parallel to, or converge in the outward direction with respect to, corresponding containment surfaces of the adjacent struts, such that between the magnetic flux conducting structure and each pair of adjacent struts there is defined a respective seat configured to snugly assemble a respective permanent magnet thereto, and wherein the flux conducting structure comprise a plurality of yokes of magnetically conductive material shaped in the form of segments of a ring, a join between two adjacent yokes is arranged at the middle of two adjacent struts, each magnet straddles the join between two adjacent yokes.

5. A permanent magnet rotor for an electric motor, rotor comprising:
- a rotor shaft;
- a magnetic flux conducting structure having an essentially cylindrical wall coaxial with said rotor shaft;
- a carrier structure overmolded onto said rotor shaft and onto said magnetic flux conducting structure, and having a disc portion and a cylindrical cage portion coaxial with said rotor shaft, joining the disc portion at periphery thereof, and having a plurality of hollow struts angularly spaced along a circumference of the cylindrical cage portion, protruding radially inward, and coaxial with said rotor shaft; and
- a plurality of permanent magnets shaped as ring segments and disposed at angular intervals within and adjacent to said magnetic flux conducting structure and between adjacent pairs of the plurality of hollow struts on the cylindrical cage portion of said carrier structure;

wherein:

said rotor shaft is fixed to a center of the disc portion of said carrier structure;

each of said plurality of permanent magnets has two circumferentially terminal faces parallel with each other or converging radially outward; and each of the plurality of hollow struts on the cylindrical cage portion of said carrier structure has on its flanks respective containment surfaces essentially parallel to, or converge in the outward direction with, corresponding containment surfaces of the adjacent hollow struts, thereby defining a seat configured to snugly assemble a corresponding one of said plurality of permanent magnets between each pair of the plurality of hollow structures and said magnetic flux conducting structure.

* * * * *